United States Patent
Kawai

(10) Patent No.: US 9,277,079 B2
(45) Date of Patent: Mar. 1, 2016

(54) IMAGE FORMING APPARATUS AND METHOD FOR DISPLAYING APPLICATION SCREEN OF IMAGE FORMING APPARATUS THAT ENSURES DISPLAY OF APPLICATION SCREEN ON OPERATION PANEL WITH DIFFERENT RESOLUTION

(71) Applicant: Kyocera Document Solutions Inc., Osaka (JP)

(72) Inventor: Takanao Kawai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/633,101

(22) Filed: Feb. 26, 2015

(65) Prior Publication Data

US 2015/0244889 A1 Aug. 27, 2015

(30) Foreign Application Priority Data

Feb. 26, 2014 (JP) ................................. 2014-035100

(51) Int. Cl.
*G06K 15/02* (2006.01)
*H04N 1/00* (2006.01)
*G06F 3/12* (2006.01)

(52) U.S. Cl.
CPC .......... *H04N 1/00941* (2013.01); *H04N 1/0097* (2013.01); *H04N 1/00405* (2013.01); *H04N 2201/0094* (2013.01)

(58) Field of Classification Search
None
See application file for complete search history.

(56) References Cited

U.S. PATENT DOCUMENTS

2007/0132787 A1* 6/2007 Ko ............................ G06F 3/14
345/660

FOREIGN PATENT DOCUMENTS

JP 2011-051164 A 3/2011

* cited by examiner

*Primary Examiner* — Dov Popovici
(74) *Attorney, Agent, or Firm* — James W. Judge

(57) ABSTRACT

An image forming apparatus into which applications are installable includes an operation panel and a resolution comparing circuit. The operation panel has a display resolution. The resolution comparing circuit compares the display resolution with resolution of an application screen that an installed application displays. If the resolution comparing circuit determines that the display resolution is higher than the application screen resolution, the image forming apparatus displays the application screen as a screen provided with a frame.

6 Claims, 4 Drawing Sheets

IMAGE FORMING APPARATUS AND METHOD FOR DISPLAYING APPLICATION SCREEN OF IMAGE FORMING APPARATUS THAT ENSURES DISPLAY OF APPLICATION SCREEN ON OPERATION PANEL WITH DIFFERENT RESOLUTION

INCORPORATION BY REFERENCE

This application is based upon, and claims the benefit of priority from, corresponding Japanese Patent Application No. 2014-035100 filed in the Japan Patent Office on Feb. 26, 2014, the entire contents of which are incorporated herein by reference.

BACKGROUND

Unless otherwise indicated herein, the description in this section is not prior art to the claims in this application and is not admitted to be prior art by inclusion in this section.

According to the latest technology, a typical image forming apparatus, which is a printer, a multifunction peripheral (MFP), or similar apparatus, ensures simplify installing an additional application convenient for a user. To execute the identical application on image forming apparatuses having operation panels with different resolutions, a known image forming apparatus causes an application to determine the resolution of the operation panel so as to switch screen data for displaying an application screen corresponding to the resolution. However, in the known image forming apparatus, every time a new image forming apparatus with a different resolution is released, it is necessary to revise the logic of the application so as to execute the application using the operation panel of the new image forming apparatus.

SUMMARY

An image forming apparatus, into which applications are installable, according to an aspect of the disclosure includes an operation panel and a resolution comparing circuit. The operation panel has a display resolution. The resolution comparing circuit compares the display resolution with resolution of an application screen that an installed application displays. If the resolution comparing circuit determines that the display resolution is higher than the application screen resolution, the image forming apparatus displays the application screen as a screen provided with a frame.

An image forming apparatus according to another aspect of the disclosure, into which applications are installable, includes an application-information data configuring circuit and an application-screen display circuit. The application-information data configuring circuit configures application information data with a plurality of resolutions for an installed application screen to be displayed by the image forming apparatus. The application-screen display circuit switches into any one of the plurality of resolutions with which the application information data is configured, to display the application screen. In instances of displaying the application screen on an operation panel, of the image forming apparatus, of higher resolution than any one of the plurality of resolutions with which the application information data is configured, the image forming apparatus displays the application screen as a screen provided with a frame.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
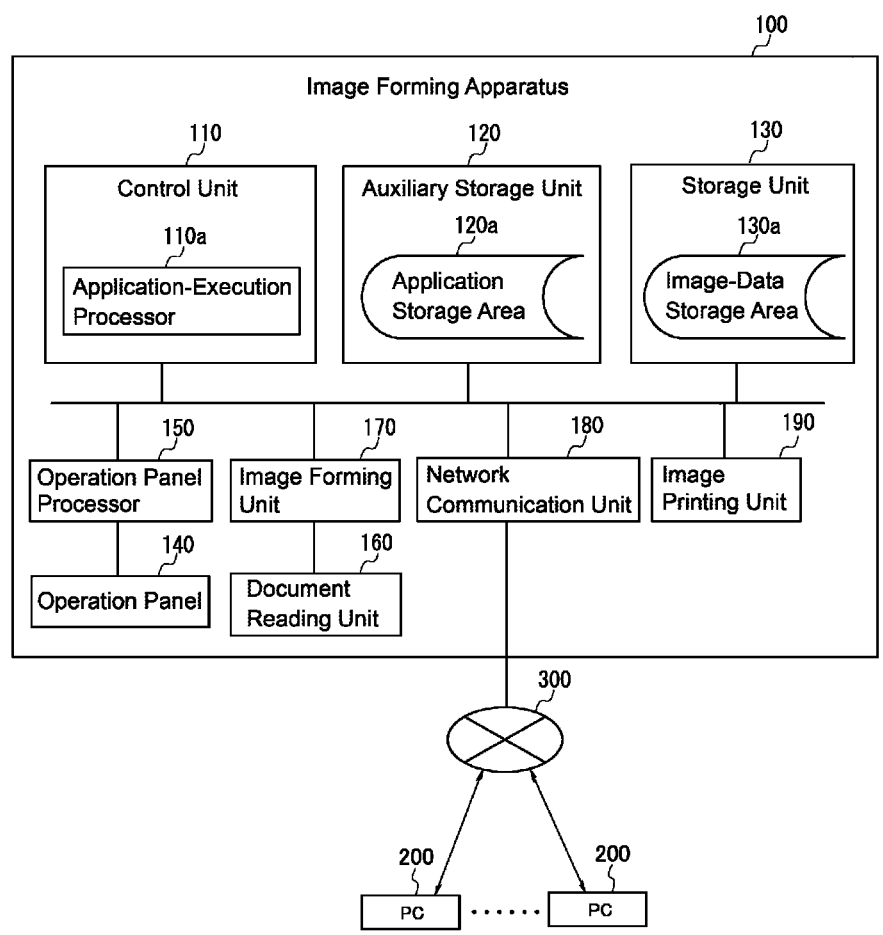
FIG. 1 is a diagram illustrating a functional block configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, a description will be given of an embodiment of the disclosure with reference to the accompanying drawings. According to the disclosure, in an image forming apparatus having an operation panel with a high resolution different from a previous resolution, a previous application displays an application screen on the operation panel of the image forming apparatus corresponding to the high resolution without changing the logic of the application when the previous application does not support an operation panel with this high resolution.

A description will be given of the functional configuration of an image forming apparatus 100 in the embodiment with reference to FIG. 1. The image forming apparatus 100 illustrated in FIG. 1 includes a control unit 110, an auxiliary storage unit 120, a storage unit 130, an operation panel 140, an operation panel processor 150, a document reading unit 160, an image forming unit 170, a network communication unit 180, and an image printing unit 190. These respective units are connected via a bus or a similar system. The control unit 110 includes an application-execution processor 110a as an application-execution circuit. The auxiliary storage unit 120 includes an application storage area 120a.

The control unit 110 is a control circuit that includes: a main storage unit such as a RAM and a ROM, and a control unit such as a micro processing unit (MPU) and a central processing unit (CPU). The control unit 110 has a controller function related to interfaces such as various I/Os, a universal serial bus (USB), a bus, and other hardware, and controls the entire image forming apparatus 100. When a user specifies the application installed on the image forming apparatus 100 from the operation panel 140 so as to issue an execution request, the application-execution processor 110a executes the specified application.

The auxiliary storage unit 120 is an auxiliary storage device that includes a flash memory and a similar storage, and stores the program and the data of the process executed by the control unit 110. The application storage area 120a saves the program and the data of an additionally installed application other than the program provided by the image forming apparatus 100.

The storage unit 130 is a storage device that includes a hard disk drive, and stores the program and the data of the process executed by the control unit 110. An image-data storage area 130a temporarily saves image data output from the image forming unit 170, image data received by the network communication unit 180, and similar data.

The operation panel 140 includes: a main storage unit such as a RAM and a ROM, and a control unit such as an MPU and a CPU. The operation panel 140 accepts a display of an operation screen and an operation by the user. The user can specify the application from the operation panel 140 so as to issue an execution request.

The operation panel processor 150 performs: a process that displays the operation item selected by the user on the operation panel 140, and a process that receives an input of the operation of the user from the operation panel 140.

The document reading unit 160 is a document reading device that reads a document set on a platen of the image forming apparatus 100. When the user issues a request for reading the document from the operation panel 140, the document reading unit 160 reads the document.

The image forming unit 170 includes an image forming circuit that converts the document read by the document reading unit 160 into image data of a printable image or an image sendable by FAX or email.

The network communication unit 180 is a network communication circuit that includes a removably attachable LAN interface for connecting to a network 300. The image forming apparatus 100 can communicate with a device such as a personal computer (PC) 200 connected to the network 300 by the network communication unit 180.

The image printing unit 190 is an image printing device that prints the image data, which is requested to be printed from the user, on a paper sheet.

Figure 2:
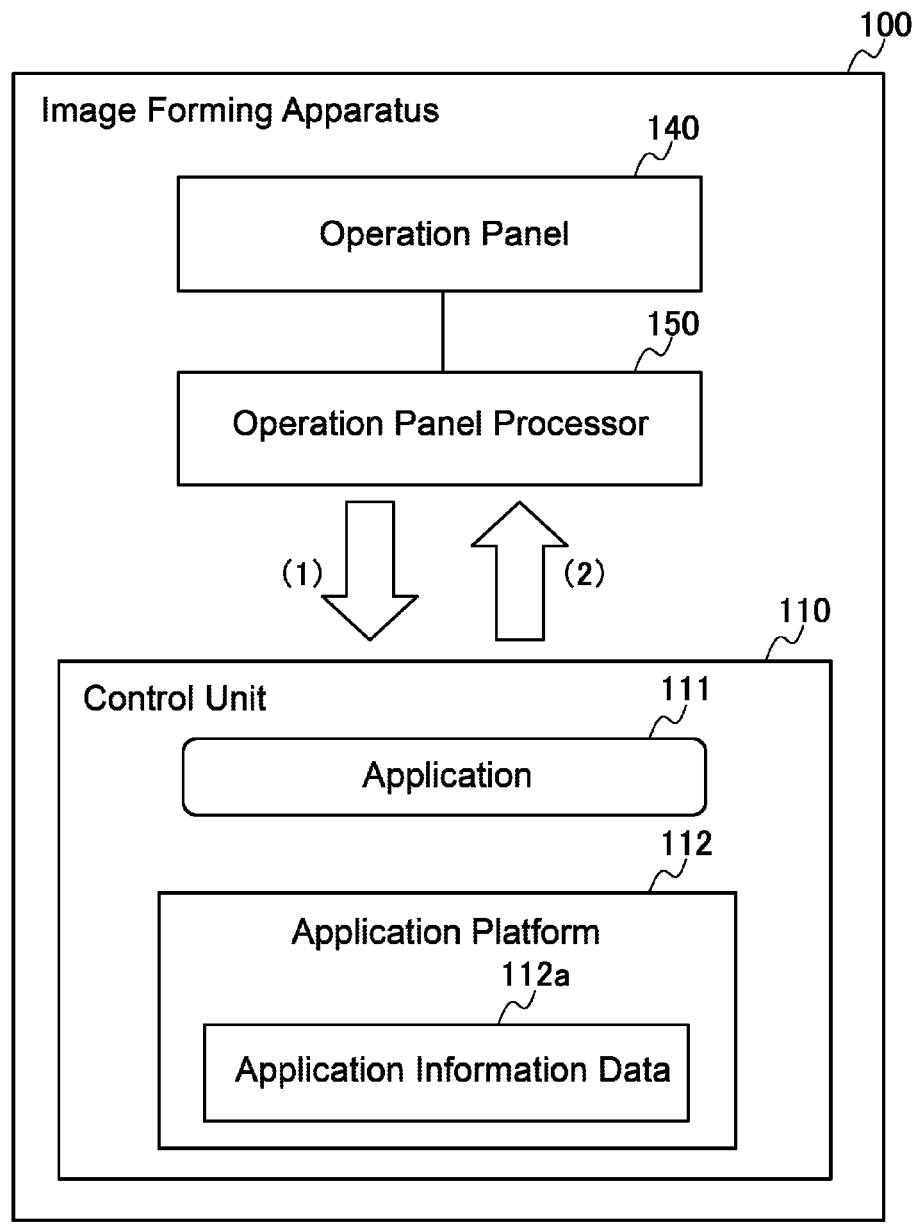
FIG. 2 is a diagram describing a display function of an application screen in the image forming apparatus according to the one embodiment.

Next, a description will be given of a display function of the application screen of the image forming apparatus 100 in the embodiment of the disclosure with reference to FIG. 2. The display function of the application screen is constituted of the operation panel 140, the operation panel processor 150, and the control unit 110. The following describes the processes of the operation panel 140, the operation panel processor 150, and the control unit 110 in the display function of the application screen.

The operation panel 140 receives an input of the execution request of an application 111 installed on the image forming apparatus 100 and displays the application screen of the application 111. The operation panel processor 150 performs: a process that receives an input of the execution request of the application from the operation panel 140 to output the execution request to the control unit 110; a process that displays the application screen on the operation panel 140; and a process that receives an input of an operation from the application screen. The control unit 110 takes the application 111, which is specified by the user, from the application storage area 120a of the auxiliary storage unit 120 using the application-execution processor 110a. The control unit 110 includes an application platform 112. The control unit 110 may operate as a screen-data Uniform Resource Locator configuring using the application platform 112. The operation panel processor 150 may operates as an application-information data configuring circuit and an application-screen display circuit.

The application platform 112 supports the environment where the application 111 is executable, and holds information related to hardware of the image forming apparatus 100, for example, the resolution and the size of the operation panel 140. The application platform 112 includes application information data 112a. In the application information data 112a, unique information related to the application 111 is set.

The unique information related to the application 111 is information such as the name of the application 111, the area where the application 111 taken by the application-execution processor 110a is located, the uniform resource locator (URL) on the Internet indicative of the location of screen data. The URL indicative of the set location of the screen data is divided as follows corresponding to the resolution of the operation panel 140. For example, when the resolution of the operation panel 140 included in the image forming apparatus 100 is "800×480," the screen data saved at "/application/default_top_screen.jsp" is taken corresponding to "URL__800×480."

Figure 3:
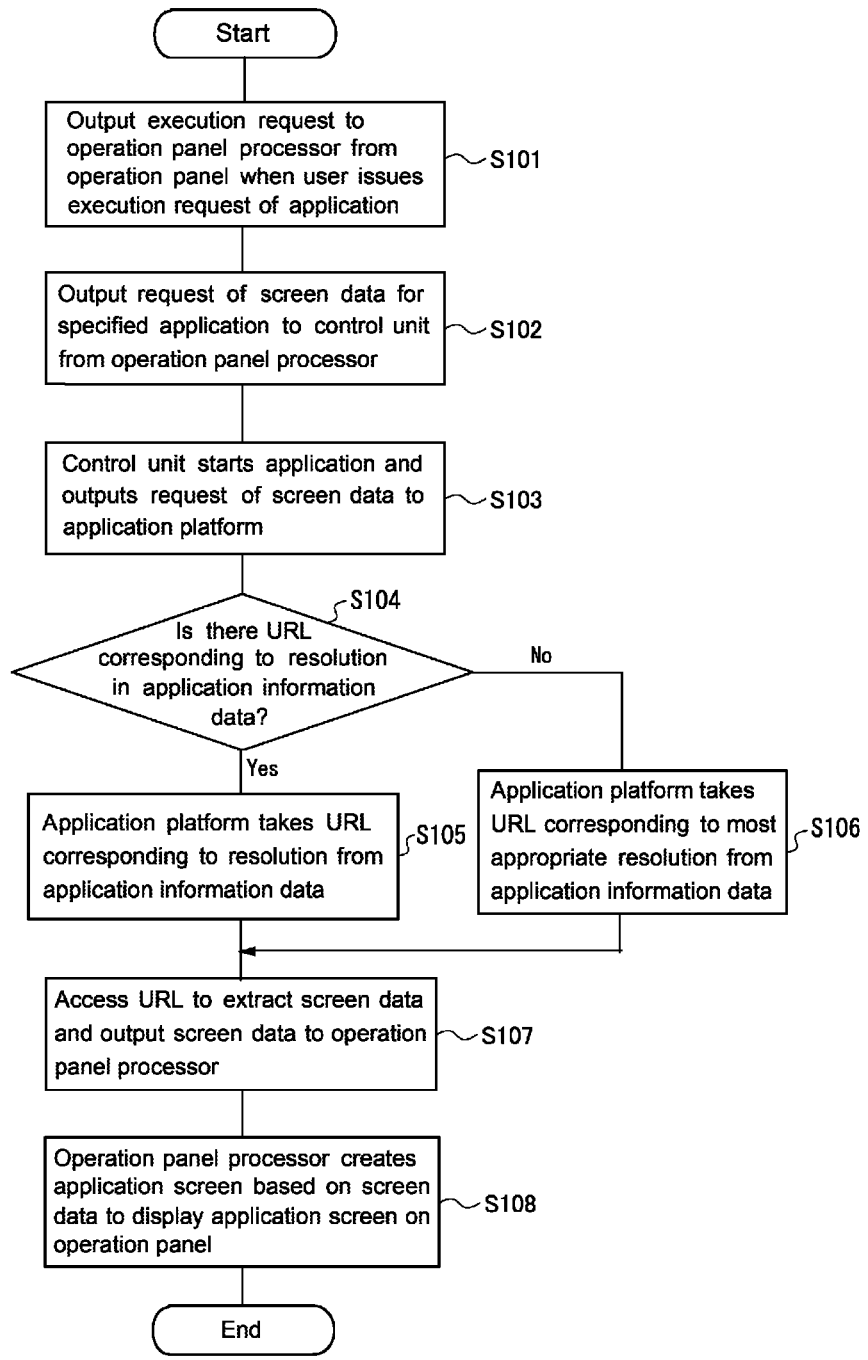
FIG. 3 is a flowchart illustrating a display procedure of the application screen in the image forming apparatus according to the one embodiment.

URL__800×480=/application/default_top_screen.jsp
URL__480×272=/application/480×272_top_screen.jsp Next, a description will be given of a display procedure of the application screen in the display function of the application screen illustrated in FIG. 2 in the order corresponding to steps of a flowchart illustrated in FIG. 3.

Step S101
Firstly, when the user specifies the application 111 from the operation panel 140 so as to issue an execution request, the operation panel 140 outputs the execution request of the specified application 111 to the operation panel processor 150.

Step S102
Subsequently, when the operation panel processor 150 receives an input of the execution request of the application 111, the operation panel processor 150 outputs a request of the screen data for the application 111 specified at step S101 to the control unit 110 as illustrated in (1) of FIG. 2.

Step S103
Subsequently, the control unit 110 starts the application 111 and outputs the request of the screen data of the application 111 specified at step S101 to the application platform 112. As just described, starting the application 111 causes operation of the application platform 112.

Step S104
Subsequently, the application platform 112 determines whether the URL corresponding to the held resolution of the operation panel 140 is present in the application information data 112a. When the URL corresponding to the resolution is present in the application information data 112a (Yes at step S104), the process proceeds to step S105. When the URL corresponding to the resolution is not present in the application information data 112a (No at step S104), the process proceeds to S106.

Step S105
When Yes is determined at step S104, the application platform 112 takes the URL corresponding to the resolution of the operation panel 140 from the application information data 112a. For example, when the image forming apparatus 100 includes the operation panel 140 with a resolution of 800×480, the application platform 112 takes the URL corresponding to the resolution of 800×480 from the application information data 112a.

Step S106

When No is determined at step S104, the application platform 112 takes the URL corresponding to the most appropriate resolution for the resolution of the operation panel 140 from the application information data 112a. For example, the image forming apparatus 100 includes the operation panel 140 with a resolution of 1024×768, and the URL corresponding to the resolution of 1024×768 is not present in the application information data 112a. Then, the application platform 112 takes the URL corresponding to the most appropriate resolution of 800×480 from the application information data 112a.

Step S107

Subsequently, the application platform 112 accesses the URL taken at step S105 or step S106 so as to extract the screen data. Then, the application platform 112 outputs the screen data to the operation panel processor 150 as illustrated in (2) of FIG. 2.

Step S108

Figure 4:
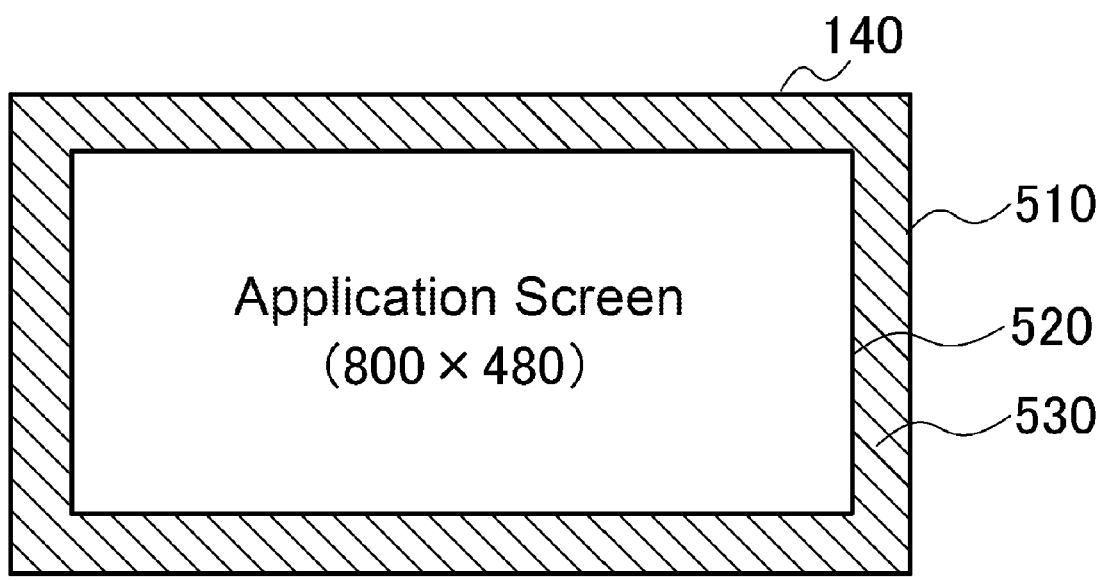
FIG. 4 is a diagram illustrating a display example of the application screen in the image forming apparatus according to the one embodiment.

Subsequently, when the operation panel processor 150 receives an input of the screen data, the operation panel processor 150 creates the application screen of the application 111 based on the screen data and outputs the application screen to the operation panel 140. At this time, when the screen data corresponding to the most appropriate resolution is taken from the application information data 112a since the screen data corresponding to the resolution of the operation panel 140 is not present, the application screen with a frame at its outline is displayed. For example, when the screen data corresponding to the most appropriate resolution of 800×480 is taken since the screen data corresponding to the resolution of 1024×768 is not present in the application information data 112a, as illustrated in FIG. 4, a previous application screen 520 with a resolution of 800×480 is displayed and a frame 530 is displayed on the outer side of the application screen 520 within a screen displaying region 510 with a high resolution of 1024×768.

As described above, in the embodiment, the image forming apparatus having the operation panel with a high resolution different from a previous resolution causes simply displaying a previous application screen on the operation panel with the high resolution even when it is too late for changing the application, which is required for displaying the previous application screen. Accordingly, an application developer needs not change the application each time an update to an operation panel with a high resolution is made, and can change the application at once when an update to a plurality of operation panels with high resolutions is made. This ensures reduction in burden on the application developer.

Here, in the embodiment, the description has been given of the application 111 that can switch the screen data for displaying the application screen corresponding to the resolution of the operation panel 140. However, this should not be construed in a limiting sense. For example, the disclosure is also applicable to the application 111 that cannot switch the screen data for displaying the application screen corresponding to the resolution of the operation panel 140. For example, when the operation panel processor 150 compares the resolution of the operation panel 140 and the resolution of the application screen and then these resolutions are the identical, the application screen is directly displayed on the operation panel 140. When the resolution of the operation panel 140 is higher than the resolution of the application screen, the application screen with the frame at its outline is displayed. This ensures a display of the application screen corresponding to the resolution of the operation panel 140. In this example, the operation panel processor 150 may operates as a resolution comparing circuit.

In the embodiment the description has been given of the procedure where the user specifies the application 111 installed on the image forming apparatus 100 from the operation panel 140 so as to display the application screen on the operation panel 140. However, this should not be construed in a limiting sense. For example, it is possible to specify the application 111 installed on the image forming apparatus 100 from the PC 200 so as to display the application screen on the operation panel of the PC 200. In this case, information such as the resolution and the size of the operation panel of the PC 200 is preliminarily stored in the auxiliary storage unit 120 of the image forming apparatus 100.

With these image forming apparatus and method for displaying the application screen of the image forming apparatus according to the disclosure, a previous application screen can be displayed on an operation panel with a high resolution even when it is impossible to immediately create the screen data and change the logic of the application. This ensures reduction in work of the application developer.

The disclosure is appropriate for a device such as an image forming apparatus where an application is installable and that has a screen display function. The disclosure is not limited to the device, and is applicable to a system where an application is installable and that has a screen display function.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus into which applications are installable, the image forming apparatus comprising:
    an operation panel having a display resolution;
    a resolution comparing circuit that compares the display resolution with resolution of an application screen that an installed application displays; wherein
    if the resolution comparing circuit determines that the display resolution is higher than the application screen resolution, the image forming apparatus displays the application screen as a screen provided with a frame.

2. An image forming apparatus into which applications are installable, the image forming apparatus comprising:
    an application-information data configuring circuit that configures application information data with a plurality of resolutions for an installed application screen to be displayed by the image forming apparatus; and
    an application-screen display circuit that switches into any one of the plurality of resolutions with which the application information data is configured, to display the application screen; wherein
    in instances of displaying the application screen on an operation panel, of the image forming apparatus, of higher resolution than any one of the plurality of resolutions with which the application information data is configured, the image forming apparatus displays the application screen as a screen provided with a frame.

3. The image forming apparatus according to claim 2, further comprising:
    a screen-data uniform resource locator, URL, configuring circuit that configures the application information data with a URL where screen data for the application screen is saved.

4. The image forming apparatus according to claim 1, wherein the image forming apparatus displays the application screen on the operation panel of the image forming apparatus, or on the operation panel of a personal computer connected to a network.

5. A method for displaying an application screen using the image forming apparatus according to claim 1, the method comprising:
- comparing the display resolution with resolution of the application screen that the installed application displays; and
- displaying the application screen as the screen provided with the frame if the comparing of resolutions determines that the display resolution is higher than the application screen resolution.

6. A method for displaying an application screen using the image forming apparatus according to claim 2, the method comprising:
- configuring the application information data with the plurality of resolutions for the installed application screen to be displayed by the image forming apparatus;
- switching into any one of the plurality of resolutions with which the application information data is configured, to display the application screen; and
- displaying the application screen as the screen provided with the frame, in instances of displaying the application screen on the operation panel, of the image forming apparatus, of higher resolution than any one of the plurality of resolutions with which the application information data is configured.

* * * * *